Oct. 29, 1940.  C. SAUZEDDE  2,219,566
BRAKE ACTUATOR SEAL
Filed June 27, 1939

Inventor
Claude Sauzedde,
By
Attorneys

Patented Oct. 29, 1940

2,219,566

UNITED STATES PATENT OFFICE 2,219,566

BRAKE ACTUATOR SEAL

Claude Sauzedde, Detroit, Mich., assignor to Detroit Hydrostatic Brake Corporation, Detroit, Mich., a corporation of Michigan Application June 27, 1939, Serial No. 281,449

10 Claims. (Cl. 60—54.6)

This invention relates to hydraulic brake actuators and the means for sealing the same to prevent leakage of fluid therefrom.

The primary object of the present invention is to provide a hydraulic brake actuator with fluid sealing means of the diaphragm type wherein the sealing diaphragm is free from the excessive fatigue causing distortion to which a diaphragm is usually subjected in a conventional hydraulic brake actuator. That is, the actuator and seal are designed with a view to eliminating excessive stretching of the diaphragm during operation of the actuator, and to thereby eliminate the stresses which cause fatigue and ultimate destruction of the diaphragm.

The present invention is particularly adapted for brake actuators of the two-stage pressure type. That is, the compressor embodies two pistons of different diameters which function, first to displace a large volume of fluid during initial operation for rapidly taking up all slack and brake shoe clearances with a relatively small brake pedal movement, and then to apply pressure at an increased leverage ratio. The present construction is for the purpose of sealing the large piston with respect to the wall of the cylinder in which it operates and also to seal it with respect to the smaller piston, and it is so designed that, when the pistons are moved relatively to the cylinder wall and to each other, the diaphragm shifts its position to accommodate such movement. That is, rather than stretching, the diaphragm has a rolling motion during advance movement of the pistons. It has been found impossible, in a two-stage brake actuator of the type herein contemplated, to completely eliminate stretching, and the diaphragm is actually stretched during the high pressure piston movement. The present invention, however, reduces the amount of stretching to an extent that it comprises a very small fraction of the length of the diaphragm.

Figure 1:
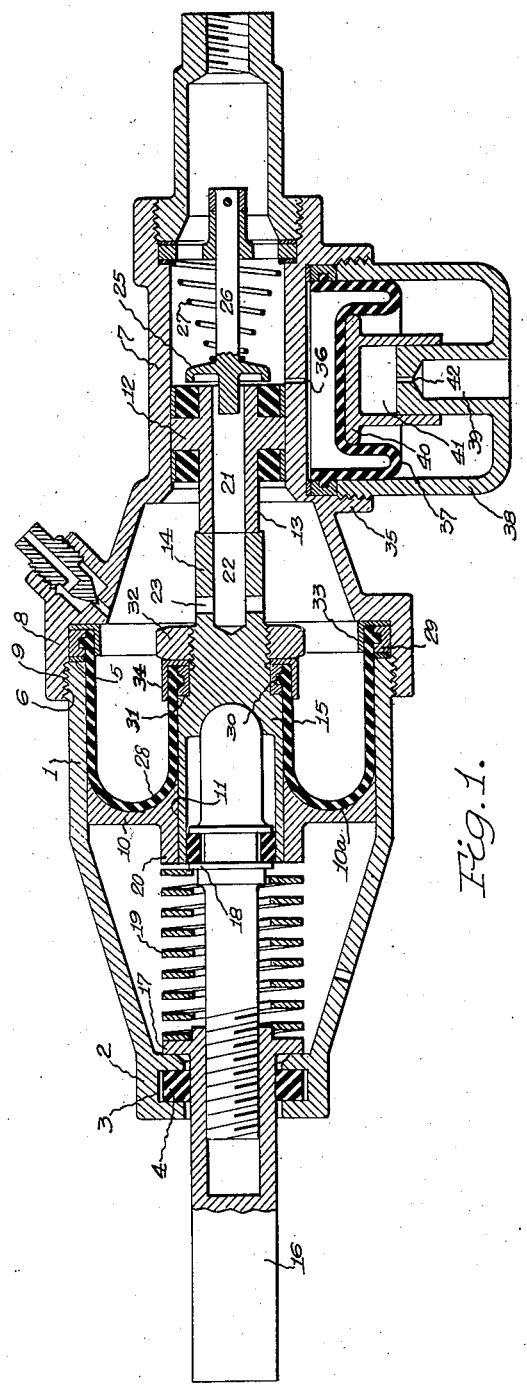
Figure 2:
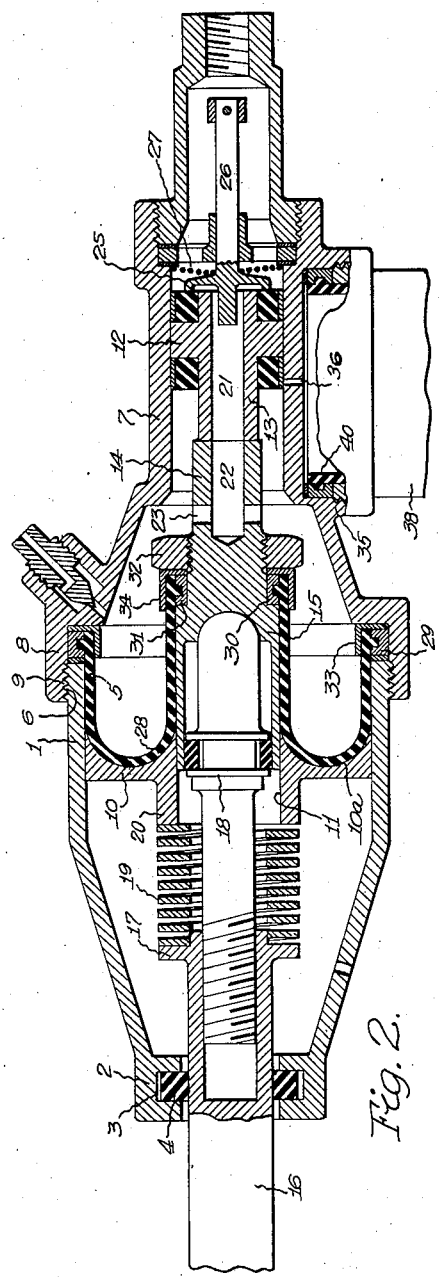

With the above and other ends in view the invention consists in matters more particularly set forth hereinafter with reference to the accompanying drawing, in which Figures 1 and 2 are longitudinal sections illustrating different stages of operation.

Like characters of reference are employed throughout to designate corresponding parts.

The numeral 1 designates a hollow cylindrical body having a reduced end portion 2 provided with an internal groove 3. A rubber ring 4 is mounted in the groove 3. Adjacent the end 5, of the body 1, is a screwthreaded portion 6. A hollow cylindrical body 7, of a diameter considerably smaller than that of the body 1, has an enlarged, annular end portion 8. The portion 8 is internally threaded at 9 for engagement with the threaded portion 6.

Slidably mounted in the cylindrical body 1 is a piston 10 having a central opening 11. In the cylindrical body 7 is a piston 12 having an axial hollow rod 13 engaged by a stem 14 on a slidable element 15. The slidable element 15 is mounted in the central opening in the piston 10 and is engaged by an actuating rod 16. The actuating rod is adapted to be moved, manually, by pedals or levers such as usually are employed to operate hydraulic brake actuators.

On the actuating rod 16 are two shoulders 17 and 18, and a coil spring 19 is compressed and confined between these shoulders. With the actuator in the inoperative position shown in Fig. 1, the spring 19 is slightly spaced from and out of contact with the end 20 of the piston 10.

The piston 12 and its rod 13 have a bore 21 extending therethrough and communicating with a bore 22 in the stem 14. Radial ports 23 permit fluid to enter the bores 22 and 21 from the cylinder 1 whereby it may flow to the chamber in body 7 during brake actuation or in the reverse direction when the brakes are released. This flow of liquid is controlled by a valve 25 yieldably supported by a stem 26 and spring 27 whereby it is adapted to seat on the piston 12 and close the port 21.

A flexible diaphragm 28 has an outer, annular, metallic reinforcement 29 permanently secured thereto and clamped against the end 5 of the body 1 by tightening the annular portion 8 thereon. The diaphragm 28 also has an inner, annular, metallic reinforcement 30 clamped against a shoulder 31 on the sliding element 15 by a nut 32. Annular elements 33 and 34, of angle section, are interposed between the reinforcements 29 and 30, respectively, and their pressure applying clamping members.

The cylindrical body 7 has an integral annular formation 35 with a port 36 opening thereinto. The port 36 is disposed immediately in advance of the forward edge of the piston 12 so that it is covered thereby during the initial part of its forward movement. In the annular formation 35 is a rubber diaphragm 37 enclosed by a cylindrical body 38 having a central guide 39. A piston 40, for the diaphragm 37, has a bearing 41 slidable on the guide 39. Air is admitted to the bearing 41 through a port 42 in the guide 39. but air is trapped in the cylindrical body 38 to resiliently oppose movement of the diaphragm.

When the rod 16 is moved from the position shown in Fig. 1 toward that shown in Fig. 2, it causes piston 12 to be moved a distance equal to that necessary to cover the port 36 prior to engagement of the spring 19 with the end 20 of the piston 10. Upon continued movement of the actuator rod 16, the spring 19 causes the piston 10 to advance and displace fluid from the body 1 through the ports 23 and bores 22 and 21 to the body 7, from which it flows through the usual outlet fitting to the brakes (not shown). The fluid thus flowing forces the valve 25 away from its seating position on the piston 12. When the back pressure against such movement exceeds the pressure exerted by the spring 19, the piston 10 stops moving, the valve 25 seats on the piston 12, and the latter becomes operative to apply pressure on the fluid.

The annular working face of piston 10 is formed concave in cross section so as to receive the diaphragm 28 which itself is convex in cross section, said diaphragm thus providing inner and outer rim portions which are secured as aforementioned, namely, the inner portion to the slidable member 15 and the outer portion to the stationary body 1. The outer wall of diaphragm 28 intermediate these inner and outer rim portions and comprising the convex formation thereof extends rearwardly along the inner wall of body 1, transversely along and across the concave working face of piston 10, and then forwardly along the outer wall of the slidable member 15, thereby isolating the hydraulic system on the working side of piston 10 from the mechanical system on the opposite side of piston 10. It is seen, therefore, that diaphragm 28, being stationarily secured at its outer rim portion and secured for slidable movement at its inner rim portion, traverses from one of its ends to the other the stationary member 1 and the relatively movable piston or slidable members 10 and 15.

The protraction of lever 16 necessary to close communication between the chambers ahead of pistons 12 and 40, by closing the port 36, causes a similar protraction of sliding member 15 while piston 10 remains stationary, because the distance between the working face of piston 12 and the far wall of port 36 is made equal to the axial length of shoulder 18 on lever 16. During this relative movement between members 10 and 15 the diaphragm 28 is caused to roll along the surfaces of members 1, 10 and 15, the diaphragm stretching only to the extent of the minute length of said protraction, said rolling being effectuated by the complementarily curved surfaces of the concavity of piston 10 and the convexity of the diaphragm 28 and by the pressure exerted by the fluid against said diaphragm. During this time the plane of the inner rim of the diaphragm approaches the plane of the outer rim thereof.

After the piston 12 has closed off the port 36, piston 10 and member 15 move together, member 15 moving under the force of the pedal pressure and the piston 10 moving under the force of spring 19. This united movement of members 10 and 15 in the braking process, during which the brake shoes are initially lodged in their respective drums, continues until the pressure set up in the chamber between the pistons 10 and 12 is sufficient to cause the seating between piston 12 and valve 25 and to cause either the floating or slight retraction of piston 10. During this united movement of piston 10 and member 15 there is pure rolling of diaphragm 28 along the members 1, 10 and 15, as the planes of the inner and outer rims of the diaphragm come closer together, the fluid pressure ahead of the diaphragm maintaining uniform contact between the adjacent surfaces of the diaphragm and members 1, 10 and 15 during such rolling of the diaphragm.

During the final setting of the shoes and drums, which is the effective phase of the braking process, the members 10 and 15 move relatively one to the other, but such movement is extremely slight, it being equal to the actual distance of the "give" between the shoe and drum. The distance moved by member 15 relative to piston 10 during this phase is the amount of stretching the diaphragm 28 undergoes which, as has been pointed out, is so slight as to be practically immaterial. The diaphragm, as in the two former phases of braking, rolls along the surfaces of members 1, 10 and 15.

The diaphragm and its arrangement with respect to the braking structure proper is highly efficient and long-wearing, the diaphragm undergoing substantially no material stretching during the various phases of braking, and it being adapted for rolling along the surfaces of and with respect to the stationary and movable members with which it is in engagement and by which it is supported, thereby reducing friction to a nullity without the sacrifice of but with a gain in sealing efficiency.

Although the invention has been described with some detail it is not intended that the description be definitive of the limits of the inventive idea. The right is reserved to make such changes in the details of construction and arrangement of parts as will come within the purview of the attached claims.

What I claim is:

1. In an actuator for hydraulic braking having a casing and a pair of relatively movable pistons within the casing, a tubular flexible seal comprising a pair of relatively movable rim portions, one of said portions being secured to the casing and the other of said portions being secured to one of the pistons, the portion of said seal intermediate its rim portions being in rolling contact with and forming an annular chamber ahead of the other piston behind said rim portions.

2. In an actuator for hydraulic braking having a casing and a pair of relatively movable pistons within the casing, a tubular flexible seal comprising a pair of relatively movable rim portions, one of said portions being secured to the casing ahead of one of the pistons and the other of said portions being secured to the other piston, the portion of said seal intermediate its rim portions being in rolling contact with and forming an annular chamber ahead of said first piston behind said rim portion.

3. In an actuator for hydraulic braking having a casing and a pair of relatively movable pistons within the casing, a flexible seal comprising a pair of concentrically arranged and relatively movable rim portions, the outer of said portions being secured to the casing and the inner of said portions being secured to one of the pistons, the portion of said seal intermediate its rim portions being in rolling contact with the casing and pistons and forming an annular chamber ahead of the other piston.

4. In an actuator for hydraulic braking having a casing and a pair of relatively movable pistons within the casing, a flexible seal comprising a pair of concentrically arranged and relatively movable rim portions, the outer of said portions being secured to the casing ahead of one of the pistons and the inner of said portions being secured to the other piston, the portion of said seal intermediate its rim portions being in rolling contact with the casing and pistons and forming an annular chamber ahead of said first piston behind said rim portions.

5. In an actuator for hydraulic braking having a casing and a pair of relatively movable pistons within the casing, a tubular flexible seal comprising a pair of relatively movable rim portions, one of said portions being secured to the casing and the other of said portions being secured to one of the pistons, one wall of said seal intermediate its rim portions forming an annular chamber ahead of the other piston, the opposite wall of said seal being flush over substantially its entire area with adjacent walls of the casing and pistons and rollable therealong during the relative movement of the pistons.

6. In an actuator for hydraulic braking having a casing and a pair of relatively movable pistons within the casing, a flexible seal comprising a pair of concentrically arranged and relatively movable rim portions, the outer of said portions being secured to the casing and the inner of said portions being secured to one of the pistons, one wall of said seal intermediate its rim portions forming an annular chamber ahead of the other piston, the opposite wall of said seal being flush over substantially its entire area with adjacent walls of the casing and pistons and rollable therealong during the relative movement of the pistons.

7. In an actuator for hydraulic braking having a casing and a pair of relatively movable pistons within the casing, a tubular flexible seal comprising a pair of relatively movable rim portions, one of said portions being secured to the casing ahead of one of the pistons and the other of said portions being secured to the other piston, one wall of said seal intermediate its rim portions forming an annular chamber ahead of said first piston, the opposite wall of said seal being flush over substantially its entire area with adjacent walls of the casing and pistons, the first piston during its forward movement approaching said rim portion attached to the casing while the other piston during its forward movement carries said other rim portion forwardly, thereby to cause the rolling of said opposite wall of said seal along said adjacent walls of the casing and pistons.

8. In an actuator for hydraulic braking having a casing and a pair of relatively movable pistons within the casing, a flexible seal comprising a pair of concentrically arranged and relatively movable rim portions, the outer of said portions being secured to the casing ahead of one of the pistons and the inner of said portions being secured to the other piston, one wall of said seal intermediate its rim portions forming an annular chamber ahead of said first piston, the opposite wall of said seal being flush over substantially its entire area with adjacent walls of the casing and pistons, the first piston during its forward movement approaching said outer rim portion while the other piston during its forward movement carries said inner rim portion forwardly, thereby to cause the rolling of said opposite wall of said seal along said adjacent walls of the casing and pistons.

9. In an actuator for hydraulic braking having a casing and a pair of relatively movable pistons within the casing, one of which pistons having a concave working face, a flexible seal comprising a pair of concentrically arranged and relatively movable rim portions, the outer of said rim portions being secured to the casing and the inner of said rim portions being secured to the other piston, the body of said seal intermediate said rim portions being convex in cross section to fit into the concavity of the first piston and to form a chamber thereahead.

10. In an actuator for hydraulic braking having a casing and a pair of relatively movable pistons within the casing, one of which pistons having a concave working face, a flexible seal comprising a pair of concentrically arranged and relatively movable rim portions, the outer of said rim portions being secured to the casing ahead of the first piston and the inner of said rim portions being secured to the other piston, the body of said seal intermediate said rim portions forming an annular chamber therebetween and having a convexity complementary to and fitting into the concavity of the first piston, whereby said seal rolls along the surfaces of the casing and pistons as the first piston approaches said outer rim portion and the other piston carries said inner rim portion forwardly.

CLAUDE SAUZEDDE.